Figure 1:
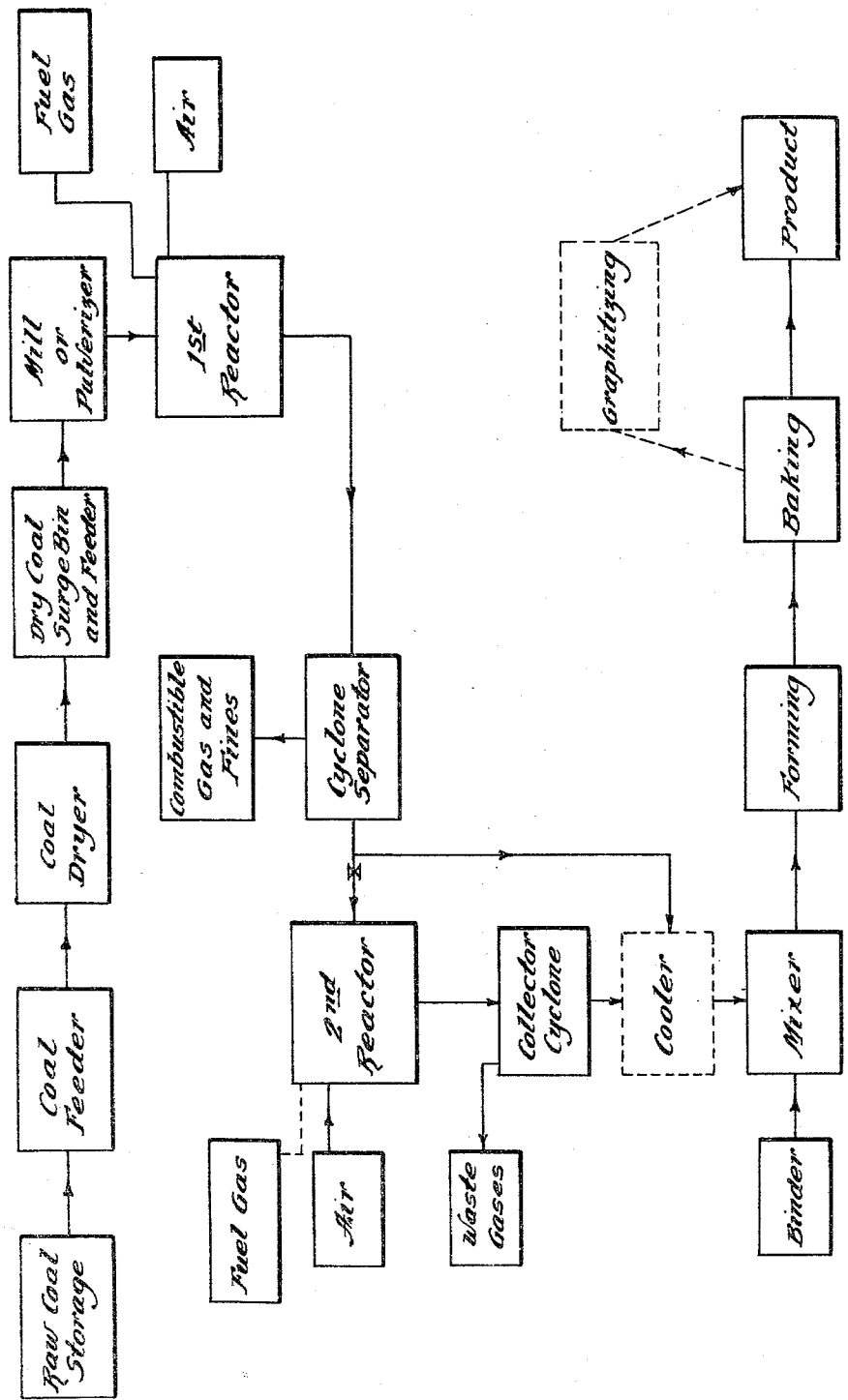

United States Patent Office 3,171,720
Patented Mar. 2, 1965

3,171,720
CARBONACEOUS BODIES USEFUL FOR THERMAL INSULATION AND PROCESSES FOR PREPARING SAME
Frederick L. Shea, Jr., Arlington Heights, Ill., and Samuel W. Martin, deceased, late of Oak Park, Ill., by Beverly Martin, executrix, Oak Park, Ill., assignors to Great Lakes Carbon Corporation, New York, N.Y., a corporation of Delaware
Filed June 23, 1961, Ser. No. 119,242
12 Claims. (Cl. 23—209.2)

This invention relates to novel carbonaceous bodies which may be used for thermal insulating purposes and to processes for preparing said bodies, which processes are also novel. More particularly, this invention relates to special baked and/or graphitized bodies and to processes for preparing same which processes include the selection and/or production of specific type starting materials and specialized intermediate treatment and processing of same to make the final products of this invention.

The carbonaceous bodies of this invention, either baked or graphitized, are characterized by their low density, low thermal conductivity or high heat insulation properties. They are further characterized by their comparatively low permeability to gases or liquids, particularly in view of their low densities.

It is, therefore, an object of this invention to provide new and useful low density baked or graphitized carbon bodies.

It is a further object of the invention to provide a process or processes for preparing such bodies.

The above objects, as well as others which will become apparent upon an understanding of the invention as herein described, may be accomplished by rapidly heating or flash-calcining in a gaseous atmosphere containing a limited and controlled amount of oxygen, a finely divided carbonaceous feed material which is normally solid at ordinary temperatures and capable of expanding on heating to plasticity, followed by separating the resulting solid expanded particle from the gaseous products, optionally further heating the separated expanded particles to remove volatile matter remaining on the surfaces of the particles, mixing said separated particles (either without or with said further heat treatment) with a binder, compacting or forming or molding said mixture, baking said compacted mixture, and, optionally, further graphitizing said baked product. The invention also contemplates processes for making such low density baked or graphitized bodies from expanded carbonaceous particles regardless of the manner or method by which said carbonaceous particles have become or been expanded.

The term "flash-calcination" as used herein may be defined as a method whereby finely divided particles of a suitable carbonaceous and preferably bituminous material are subjected to a very rapid upheat rate, in a reactor or chamber maintained at a temperature of 1150° F. or higher such as between about 1150° F. and about 2000° F. but at a temperature sufficient to ignite the particles. This rapid upheat of the particles is conducted in a gas stream of oxygen or in the presence of air or other oxygen-containing gas (or oxidizing gas), the oxygen being present in a limited or controlled amount such as between about 2.0 and about 4.0 standard cu. ft./lb. of carbonaceous particles and in an amount also such that at least 10% of the evolved combustible volatile matter remains unburned. The amount of air or oxygen present is sufficient to make the process self-sustaining while permitting expansion of the individual carbonaceous or bituminous particles at a rapid rate, but is insufficient to permit more than a minimum burning of the individual expanded or cellular product particles. In general, it has been observed that higher temperatures may be tolerated when larger particle feed sizes are used.

In a preferred embodiment of the invention (with respect to the production of the low density carbonaceous particles from which the baked or graphitized bodies are made), finely divided bituminous feed material which is normally solid at ordinary temperatures and which is capable of expanding on heating to plasticity is employed and is processed in three main stages prior to being mixed with a binder, formed or molded, and baked, etc. This embodiment is depicted in the flow sheet of FIGURE 1.

In the first stage or 1st reactor, the feed material is rapidly heated or flash-calcined in a gaseous atmosphere containing oxygen in an amount such that at least 10% of the evolved combustible volatile matter remains unburned. In the second stage of the process the resulting expanded particles are separated, typically by means of a cyclone separator, from fines and from gaseous and vaporous products at a temperature not less than that at which substantially all of the vaporous products of the first stage remain in the vaporous state. This temperature will vary with the type of feed material employed and is intended to be high enough to minimize condensation of the vapors on the expanded particles. In the third stage, or second reactor, the separated expanded particles are given a further heat treatment to remove volatile matter remaining or condensed on the surface of the particles. This heat treatment may consist of heating the particles in contact with air or oxygen or oxidizing gases at a temperature sufficiently high to burn off the volatile matter remaining on the surfaces of the particles or it may consist of contacting the particles with a stream of fuel gases, such as an inert flue gas, at a temperature sufficiently high to distill off the volatile matter remaining on the surfaces of the particles. In the process of FIGURE 1, air is bled into the second reactor in sufficient quantity to maintain the reactor temperature at about 1300° F. to about 2300° F. The product of this third stage operation is removed from the bottom of said second reactor and may typically be carried to a collector cyclone, from the top of which waste gaseous products from the second reactor are carried away or to a scrubber, and from the bottom of which the product carbonaceous particles are obtained.

The bulk density of these expanded carbonaceous particles should be maintained at a value of less than 25 lbs./cu. ft. and preferably between about 6 and about 20 lbs./cu. ft. The type of product desired can best be produced where the rapid heating or flash-calcining temperature in the first stage is maintained at no less than about 1150° F. and no more than about 2000° F., the optimum temperature varying with the feed size and type of carbonaceous or bituminous material used. Employment of too low a temperature will result in an insufficiently expanded product. Use of too high a temperature will result in undue shrinkage or collapse of the particles and a consequent excessively high bulk density of the product.

Control of the temperature of heat treatment in the first stage is accomplished primarily by regulating the air or oxygen intake, although the volatile matter content of the starting material and the amount of fuel gas employed also have influence upon the temperature. It has been found that the required amount of oxygen in standard cu. ft./lb. of carbonaceous or bituminous material is between about 2.0 and 4.0 when unheated air is used as the source of oxygen. Lesser amounts of oxygen can, of course, be used if either the feed or the air or oxygen intake are preheated or if the source of oxygen be relatively pure oxygen or oxygen enriched air, etc. In any event, the oxygen should be present only in such an amount that at least 10% of the evolved combustible volatile matter remains unburned. This unburned volatile matter is largely separated from the expanded articles in the second stage separator from which it is conveyer to some disposal point such as a combustion chamber. By thus limiting the burning of evolved combustible volatile matter in the first stage, reactor temperatures can be maintained sufficiently low (2000° F. or lower), to avoid the aforementioned shrinkage or collapse of the bituminous particles.

The expanded particles obtained from the first stage are not as free of volatile matter for use in further process steps as generally is desired, but in the second reactor or third stage of FIGURE 1, additional heat treatment is supplied in order to further condition the particles prior to employing them in the subsequent steps of the process. This three-stage method of processing the particles results in substantially higher yields and quality of the desired expanded particles than can be achieved in, for example, a single stage process in which both expansion and substantially complete devolatilization is or would be sought in the one stage. The preferred process of this invention, therefore, utilizes a particle processing procedure in which there is controlled expansion of the particles in a first stage, a separation of expanded particles from liberated volatiles in a second stage, and controlled heating in a third stage.

An alternative method of preparing the low density baked or graphitized bodies of this invention, involving different particle processing procedure, is also depicted in FIGURE 1. This process utilizes particles which have also been expanded in a first stage and which in a second stage have been separated from the gases evolved in the expansion step, but which are not processed in the third stage or second reactor and which, therefore, have not been devolatilized as greatly as particles processed in the preferred manner.

Figure 2:
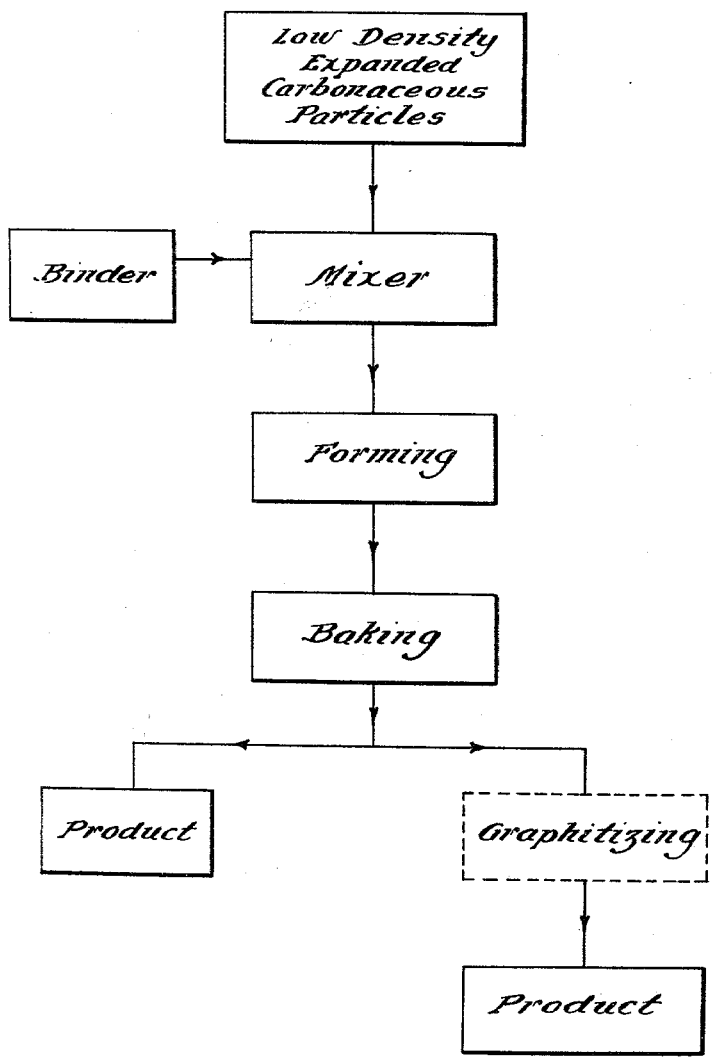

Other means for producing expanded carbonaceous particles of low bulk density may also be resorted to and this invention contemplates the making of baked and/or graphitized bodies out of same, the production of such bodies being considered new with this invention. FIGURE 2, therefore, depicts the making of novel baked and/or graphitized bodies of this invention, regardless of the manner by which the low density, carbonaceous particles have been produced.

While it is preferable that the source of heat used in each of the reactor stages be the particle itself, it is conceivable, and within the contemplation of this invention, that a substantial portion of the heat may be supplied by some ouside source or auxiliary fuel. The most rapid upheat rates are, of course, obtained using the particle itself as the source of heat.

The raw material employed to produce the expanded carbonaceous particles may be any finely divided carbonaceous material, preferably of the bituminous type, which is normally solid at ordinary temperatures and capable of expanding on heating to plasticity. By the latter is meant the ability of the material to soften when heated through the plastic state and swell if the volatile matter of each particle is driven off at a sufficiently high or rapid rate. Examples of such materials include low volatile, mid-volatile and high volatile bituminous coals, impsonite and albertite, high volatile (such as around 25%) petroleum coke, raw coal tar pitch coke, and coal tar pitch fortified with any of the various thermal blacks or carbon blacks. In any event the processing history of the raw material selected must not include any heating at a temperature high enough to result in a permanently set carbonaceous structure. Any raw material subjected to such temperature will not expand satisfactorily on heating to plasticity under the conditions disclosed herein.

As previously stated, other low density carbonaceous particles may also be employed in making the baked and/or graphitized bodies of this invention, even if they have not undergone heat treatment such as described above, but this in not generally preferred.

In preparing the preferred carbonaceous material described above (which for convenience in FIGURE 1 is designated as raw coal) for the first stage rapid heating or flash-calcination operation, the material must generally be suitably ground or milled to produce finely divided particles, although it is contemplated that in some cases the starting materials may already be in this condition or that some subdividing of the particles may take place in the first stage reactor. This involves the use of a hammer mill, or other appropriate commercial coal pulverizing apparatus which will reduce the starting material to a particle size of about 95% —100 mesh and preferably about 75 to 95% —200 mesh. These feed sizes are to be preferred in order to produce from the starting material an expanded coal or carbonaceous product from either the first or second reactors which will have a particle size falling within the range of 5 to 1000 microns and preferably within the range of 5 to 140 microns, very little or only minor percentages of the product falling outside the designated ranges. The milling and classification (by either dry or wet methods) of the carbonaceous feed material is also contemplated, under certain circumstances, in order to closely control the particle and pore size distribution of the final baked and/or graphitized bodies, as well as to influence or control the apparent density, permeability, thermal conductivity, etc., of said bodies. It should be noted that as used in this invention baking means heating to conventional baking temperatures between about 800° C. and about 1200° C., or between about 1472° F. and about 2192° F., and also to temperatures up to about 2000° C. or 3632° F., graphitizing means heating to temperatures between about 2000° C. (3632° F.) and about 3000° C. (5432° F.); and baked and graphitized bodies means bodies that have been heated to these temperatures.

In preparing the expanded carbonaceous particles by the processes described herein, particularly beneficial results are obtained by maintaining the moisture content of the raw material at a value of less than 5% by weight. Excess moisture in the carbonaceous or bituminous material fed to the reactor or unit in which the flash-calcination is conducted necessitates vaporization of the water to a temperature above 1150° F., or whatever reactor temperature is used, which sharply reduces the rate of temperature rise of the carbonaceous particles. Often this must be done by burning additional fuel in the unit since excess moisture in the particles reduces the temperature of the operation to a point where the desired results are not obtained.

The carbonaceous bodies, whose process of manufacture is described herein may be made from particles which have a very narrow particle size distribution. For example the carbon bodies may be made from particles whose size is less than 100 mesh and not more than 25% —10 microns; or the bodies may be made from particles whose size is graduated and falls essentially within the range of 5 to 70 microns. Proper or desired particle size distribution may be obtained by air classification of either or both the feed material and the product of any stage employing means known to those skilled in the art; the product may also be wet classified. Both of these operations may be resorted to and are designed to restrict upper and lower limits with respect to the size of the particles, but such close classification of the particles is not necessary to produce the low density bodies of this invention, nor is it generally desirable unless product demands dictate it, because of the additional processing involved.

As used in the application and claims, screen mesh sizes and the corresponding maximum size of particles passing therethrough are as follows:

| Screen Mesh Size | Maximum Size of Particles Passing Therethrough in Microns |
| --- | --- |
| 10 | 1,651 |
| 14 | 1,168 |
| 20 | 833 |
| 28 | 589 |
| 32 | 495 |
| 35 | 417 |
| 48 | 295 |
| 65 | 208 |
| 100 | 147 |
| 150 | 104 |
| 200 | 74 |
| 325 | 43 |
| 400 | 37 |

When it is stated in the specification or claims that the particles have a size within the range of about 5 to about 1000 microns, this means that substantially all of the particles are of a size falling within this range, but that very minor amounts such as less than about 5% of the particles may fall outside the size range set forth. This is also true for other particle size ranges such as between 5–140 microns.

A further requirement for producing the carbonaceous bodies of this invention is that the expanded carbonaceous particles employed in making same have a bulk density of less than about 25 lbs./cu. ft., and preferably within the range of about 6 to about 20 lbs./cu. ft. Bulk density values are determined by permitting the product to fall freely into a graduated cylinder and measuring the loose-settled volume of a given weight of the product.

In addition to the foregoing definitions, the following will be useful in describing the processes of this invention or the starting particles or the intermediate carbonaceous particles produced by the processes of this invention:

The "volatile content" of the starting carbonaceous material, for example raw bituminous coal, as well as the expanded carbonaceous particles, is exclusive of water, and is determined by a procedure which is a modification of ASTM procedure #D271–48. A small sample of the starting material or of the expanded particles is heated to 950° C. or 1742° F. for 5–10 minutes, the difference in weight between the sample and the final product being defined as "volatile content." The words "substantially devolatilized" employed to describe the carbonaceous particles which have been sent through the second reactor or the third stage of FIGURE 1, are meant to denote that the particles, before they were processed through the first and second reactors, possessed considerably more volatile content than they have after leaving the second reactor, but that they still might have minor percentages of volatile matter content, such as between about 1.5 and 3.2%, after leaving the second reactor.

In a preferred embodiment of the invention for making the expanded carbonaceous particles, finely divided bituminous coal of such a size that at least 75% pass through a 100 mesh screen and having a volatile content between about 14% and about 23% is flash-calcined or rapidly heated by entraining in an air stream and feeding it into the top of a vertical reactor, designated as the first reactor. Secondary air is supplied to the reactor to give a total oxygen content of between 2.2 and about 3.5 standard cu. ft./lb. of coal and to produce a reactor temperature between about 1350° and about 1600° F. The expanded solid product of this first stage is then separated from the gaseous products in a cyclone separator operated at a temperature not less than that at which substantially all of the vaporous products remain in the vaporous state. These particles are then preferably also conveyed into the top of a second vertical reactor (although as previously stated and as indicated by the valve in FIGURE 1, this step may sometimes be bypassed in the making of the carbon bodies of this invention). Secondary air is supplied to this reactor to produce a temperature sufficiently high to burn off residual volatile matter remaining on the surface of the particles. As stated previously, the product of the second reactor is carried to a collector cyclone where the desired product is separated from the gaseous products. The solid particles from either the first reactor or the second reactor are then processed by procedures which will be described more fully hereinafter.

The residence time of the carbonaceous particles in the first and/or second reactors are dependent upon the sizes and volatile content of the particles, the reactor temperatures and dimensions, feed rates, and the ratio of oxygen to the carbonaceous particles. In a typical installation, the reactors will both have dimensions of 20 feet in length and an inside diameter of 5 feet. In such a case, a particularly useful residence time in the reactors for medium volatile coal particles (75% −200 mesh particle size) is from 3–30 seconds, or a particle velocity of from about 7 to 0.7 feet per second.

In order to further illustrate the invention, but with no intention of being limited thereby, the following examples are set forth in which various types of solid carbonaceous materials with controlled moisture content were preliminarily ground to suitable particle size after which the comminuted material was processed in the manner indicated.

EXAMPLE 1

A sample of Lilybrook No. 3 Mine bituminous coal having a volatile content of 17% was milled to 75% −200 mesh. The first stage reactor was preheated to a temperature of 1410° F. by burning gas supplied to auxiliary burners in the reactor. A stream of the coal was then fed through the reactor at a particle velocity of 1.5 ft. per second and processing was carried out as described in the preferred embodiment above, utilizing the second reactor. The feed rate was 135 lbs. per hour. The maximum temperature in the first stage reactor was 1562° F. The minimum temperature in the second stage (cyclone separator) was 810° F. The maximum temperature in the third stage or second reactor was 1960° F. The product had a volatile content of about 3%, a bulk density of 15 lbs./cu. ft. and a particle size of 16% +150 mesh, 71% −200 mesh and 46% −325 mesh.

EXAMPLE 2

A sample of Lilybrook No. 3 Mine bituminous coal having a volatile content of 17% was milled to 75% −200 mesh. The first stage reactor was preheated to a temperature of 1410° F. by burning gas supplied to auxiliary burners in the reactor. A stream of the coal was entrained in air so that the oxygen to coal ratio was 3.0 to 1 and was then fed into the reactor at a particle velocity of 1.5 ft. per second. The feed rate was 135 lbs. per hour. Secondary air was supplied to the reactor to produce a reactor temperature of 1562° F. The expanded solid product was then separated from the gaseous product in a cyclone separator operated at a temperature of not less than 810° F. so that the vaporous products remained in the vaporous state. The product, which was not cycled through the 2nd reactor, had a volatile content of 8%, a bulk density of 8 lbs./cu. ft. and a particle size of 30% +150 mesh, 52% −200 mesh and 37% −325 mesh.

EXAMPLE 3

An identical sample of milled coal and the same processing apparatus as were used in Example 1 were employed with slightly different reactor conditions. The feed rate was 161 lbs. per hour. The maximum temperature in the first stage reactor was 1605° F., the minimum temperature in the second stage was 815° F., and the maximum temperature in the third stage or second reactor was 2025° F. The substantially devolatilized product had a volatile content of 2%, a bulk density of 14–16 lbs./cu. ft., and a particle size of 20–25% +150 mesh, 55–60% —200 mesh and 35–45% —325 mesh.

EXAMPLE 4

A sample of Red Jacket bituminous coal having a volatile content of 22% and a feed size of 75% —200 mesh was processed as described in Example 1 using a feed rate of 131 lbs./hour, a first stage reactor maximum temperature of 1492° F., and a third stage (second reactor) maximum temperature of 2025° F. The substantially devolatilized product obtained in a yield of 42%, had a volatile content of 3%, a bulk density of 10.5 lbs./cu. ft., and a particle size of 45% +150 mesh, 40% —200 mesh and 23% —325 mesh.

EXAMPLE 5

A sample of Ditney Hill bituminous coal having a volatile content of 36% and a feed size of 63% —200 mesh was processed as described in Example 1 using a feed rate of 155 lbs./hour. The maximum reactor temperatures were 1639° F. in the first reactor and 2217° F. in the second reactor. The substantially devolatilized product had a volatile content of 3%, a bulk density of 13.5 lbs./cu. ft., and a particle size of 32% +150 mesh, 55% —200 mesh and 35% —325 mesh.

EXAMPLE 6

A cample of Lilybrook No. 3 Mine coal milled to 79–75% —200 mesh was processed as described in Example 1. The feed rate fas 138 lbs./hour. The maximum reactor temperature in the first stage was 1693° F. The air to coal ratio was 19.3 cu. ft./lb. of coal. The product, obtained in a yield of 70%, had a volatile content of 2%, and a bulk density of 18.5 lbs./cu. ft.

EXAMPLE 7

A sample identical to that used in Example 6 above was processed in the same manner except that the feed rate was 124 lbs./hour and a maximum first stage reactor temperature was 1472° F. The air to coal ratio was 17.8 cu. ft./lb. of coal. The product, obtained in a yield of 69%, had a volatile content of 2.5%, and a bulk density of 13.5 lbs./cu. ft.

EXAMPLE 8

A sample identical to that used in Example 6 above was similarly processed except that the feed rate was 125 lbs./hour and the maximum reactor temperature in the first stage was 1459° F. The air to coal ratio was 17.8 cu. ft./lb. of coal. The product, obtained in a yield of 83%, had a volatile content of 2.5%, and a bulk density of 12.5 lbs./cu. ft. As with the preceding examples, the product particles of Examples 6–8 were of widely varying sizes.

EXAMPLE 9

A sample of Williams bituminous coal, Seam No. 6, having a volatile content of 37% by weight was milled to 49% —200 mesh and processed similarly to Example 1. The first stage reactor temperature was 1460° F. However, instead of passing to the second reactor, the particles from the cyclone separator were calcined in a moving bed in an oxidizing atmosphere for 10 minutes at 1500° F. The product had a volatile content of 5%, a bulk density which was extremely low, being 7.0 lbs./cu. ft., and a particle size of 50% +150 mesh, 35–40% —200 mesh and 25% —325 mesh.

EXAMPLE 10

A sample of Royalty bituminous coal having a volatile content of 22% was milled to 50% —325 mesh. The coal was then processed according to the procedure outlined in Example 2. The product had a volatile content of 13%, a bulk density of 10 lbs./cu. ft., and a particle size of 48% +150 mesh, 38% —200 mesh and 23% —325 mesh.

The foregoing examples have been set forth in order to illustrate various and generally preferred methods of producing expanded carbonaceous particles of low bulk density which are suitable for use in making the low density baked and graphitized bodies of this invention. The examples also highlight several of the variables which are possible or permissible, in making said expanded particles. Some of these variables comprise: different starting materials such as Lilybrook, Red Jacket, Ditney Hill, Williams and Royalty coals, all of which are bituminous coals, which are preferred; different volatile contents of said starting materials such as from 17% to 37% although this may vary from about 10% to about 45%, with 14 to 23% preferred; different particle sizes of said starting materials; variable 1st and 2nd reactor temperatures; variable feed rates and air to coal ratios; the employment of a 2nd reactor or the by-passing of same as in Examples 2 and 10; and varying bulk densities, particle sizes and volatile contents of the produced expanded particles which are then employed in the further steps of the process of this invention. Milling of the product from the cyclone separator before it is cycled to the 2nd reactor is also contemplated and sometimes desirable.

The 1st and 2nd reactors employed in the foregoing examples, in which the feed rates stated were employed, were pilot plant size, 18 inches in diameter and 8¾ feet and 14¾ feet high, respectively. It should be appreciated, of course, that larger reactors having dimensions such as previously set forth, and having higher feed rates may also be employed.

The further steps of the process of this invention comprise mixing expanded particles, such as are produced and described in the preceding examples, with a suitable binder and under suitable mixing conditions, and then forming, baking and/or graphitizing said mixtures all according to procedures now to be described. As depicted in FIGURE 2, these procedures apply generally to any low density, expanded carbonaceous particles, regardless of whether they have been produced according to the procedures described in the examples, or by using equipment as has been described or by employing the processes shown in FIGURE 1.

The procedures employed in making the baked and/or graphitized bodies of this invention, starting with any suitable low density, expanded carbonaceous particles, comprise several steps as follows:

(1) Mixing the expanded carbonaceous particles with a binder;
(2) Forming the blended mixture;
(3) Baking the formed blend, sometimes employing a preliminary curing step, depending on the binder used; and
(4) Optionally graphitizing the baked body.

As previously stated, the particles should be of a certain nature. They should be of a carbonaceous material and preferably should have been expanded in the course of their processing history. They preferably also should be somewhat vesicular in nature, possessing a high percentage of totally closed voids. The particles themselves and the bodies made from same generally are characterized by possessing a high percentage of extremely fine pores and an average overall porosity which may be as high as 80%. The particles should also have a bulk density no higher than about 25 lbs./cu. ft. and preferably between about 6 and about 20 lbs./cu. ft. They should have a particle size within the range of about 5 to about 1000 microns and preferably within the range of about 5 to about 140 microns. They shoud have a volatile content of less than about 15%, but preferably should be substantially devolatilized (have considerably less volatile content than the starting material from which they were processed and typically, a volatile content less than about 3%).

The binder to be mixed with particles having the aforedescribed properties should also be of a certain nature. From a technical or functional point of view it should have properties that enable it to be mixed evenly and uniformly with the low density carbonaceous particles without the formation of undesirable or non-uniform clusters of materials, or of small unevenly mixed lumps or of masses unduly predominating in one or the other of the ingredients. The binder should also be capable of being mixed with the expanded carbonaceous particles using reasonable amounts of power or mixing force and at reasonable temperatures. In other words, the mixing operation should be capable of being carried out using conventional mixing apparatus and at temperatures which are not unduly high, if elevated temperatures are employed. Such elevated temperatures, if required or desirable, may come from mixing heated particles (at such temperatures as they may come from the cyclone separator or the 2nd reactor without undergoing any cooling or undergoing only partial cooling). Or the particles may have been cooled, stored for awhile, and then reheated. Or the binder itself may be heated to elevated temperatures prior to being mixed with the particles. In other words, depending on the particular binder system employed and its viscosity at room temperatures, etc., the mixing step may sometimes be carried out by using particles and a binder which are both at room temperature, or particles which are at room temperature and a binder which is at an elevated temperature, or particles which are at an elevated temperature and a binder which is at room temperature, or by mixing particles and binder which are both at elevated temperatures. Regardless of the particular procedure employed, what is required is that the binder uniformly coat the particles and that a uniform mixture result, relatively free of lumps or clusters of particles alone or binder alone. The binder employed in the mixing step must also be one which will impart a sufficient degree of strength to the "green" bodies formed from the mixture so that said bodies can be handled and processed through a subsequent baking or curing and baking operation. The binder should also be one which will not only enable said green bodies to stay together throughout the entire baking step, but also result in baked bodies which have reasonably good strength properties, such as tensile strength and compressive strength, after being baked. Preferably also the binder system employed should have all of the foregoing properties or fulfill all of the foregoing requirements, and also be capable of being processed through graphitizing temperatures without adverse effect or without losing its binding properties. Binders, which upon being heated to baking temperatures are largely converted to carbon, are preferred. We have found several binders which are very suitable for fulfilling all of the above requirements and which therefore are preferred for use in making the baked and/or graphitized bodies of this invention. These binders are coal tar, coal tar pitch, pitch mixed with a diluent, emulsified coal tar, dehydrated coal tar, and furane resins, such as catalyzed furfuryl alcohol and catalyzed Fura-Tone. Fura-Tone is a registered trademark of the Minnesota Mining & Manufacturing Company for a catalyzed co-polymer of furfural and acetone. Other thermosetting and thermoplastic binders may also be employed.

Two-stage binder systems are also contemplated and may be utilized, one binder of a temporary nature for room temperature molding and setting, and the other binder to provide cohesion at elevated firing temperatures. The room temperature or temporary binder may comprise carbohydrates such as dextrin, sugar and starch products with maize-starch being preferable because of its cheapness. Potato, rice, wheat or barley starch, uncooked or cooked, also function satisfactorily. Prepared or modified starch, such as ordinary instant laundry starch may also be used. The permanent binder, typically a bituminous material, is preferably utilized in as fine a powdered state as possible, a typical product being a pitch core compound type. Flake bitumens may be utilized as raw material if they are ground to sufficient fineness in such comminuting means as ball mills or grinders. The bitumen of the preferred type has melting point of not less than 250° F. and not more than 350° F. The bituminous component may be coal tar, asphalt, gilsonite, vegetable oil pitch, etc.

The enumeration of the foregoing binder systems is not meant to preclude the utilization of other binders which may be equally, or even more, or somewhat less effective, so long as they comply with the previously stated requirements. The binder should also be one which is capable of fulfilling its function when employed in reasonable amounts, such as between about 10 and about 60 parts of binder by weight per 100 parts of low density carbonaceous particles, and preferably between about 20 and about 40 parts by weight of binder. In the present invention when employing a coal tar or pitch type binder, it is generally preferred that both the low density particles and the binder employed be at temperatures of between about 100° C. or 212° F. and about 170° C. or 338° F. for the mixing operation and that they be mixed together for periods from about 5 to about 30 minutes and typically about 15 minutes. Any conventional mixer equipment may be employed such as a Sigma mixer or a Smith turbine type mixer.

After the low density particles have been mixed with a suitable binder in a manner according to procedures such as discussed above, the mixture is then compacted or formed or molded into the desired shape and dimensions prior to being baked. We have frequently found it desirable to form the mixture at room temperatures, that is, employing unheated forming apparatus and unheated or room temperature mixture. However, employment of elevated temperatures such as up to about 200° C. or 392° F. for either the apparatus or the mixture, or both, during the forming operation may sometimes be necessary or preferred, depending upon a number of factors, such as the particular binder employed, etc.

Several factors are taken into consideration when carrying out the forming operation, chief of which is the apparent density desired for the formed "green" body produced, as well as the resultant apparent density of the body as it is conducted through the baking and/or graphitizing operations. This property is influenced by many things, such as the initial bulk density of the particles prior to their being mixed with the binder, the manner of mixing the particles and binder, and the mixing conditions employed, the weight or quantity of the mixture which is employed prior to compacting, the volume reduction effected during the forming operation and the pressures employed during the forming operation. High molding pressures are not required, and generally are to be avoided. The pressure applied during the molding or forming operation need rarely exceed 1500 lbs. per square inch (although pressures greater than this are considered within the scope of the invention) and need only be of such magnitude that the formed, unfired article is sufficiently strong for handling and to be transferred from the mold to the firing or baking furnace without undue breakage. The strength of the body produced is also greatly influenced by the above factors such as the type and amount of binder employed, the processing history of the carbonaceous particles, the mixing techniques, and the procedures employed during the molding operation. We have found that it is generally possible to make bodies having satisfactory densities and strengths, throughout the forming, baking and/or graphitizing operations—as well as other suitable properties which will be discussed hereinafter—if one employs a starting mixture having a weight to volume ratio from about 0.2 to about 0.9 gram per unit cc. before compacting, utilizing molding pressures varying generally from about 100 to about 1500 p.s.i., and also mixing and forming temperatures between about room temperature and about 200° C. If the production of bodies of relatively large volume is desired, the weight of the starting mixture is correspondingly increased, maintaining essentially the same weight to volume ratio as is employed in producing smaller type bodies. This will result in the production of formed green bodies, as well as baked and/or graphitized bodies, having apparent densities between about 0.4 and about 0.9 g./cc. and preferably between about 0.50 and about 0.80 gram/cc.

In the present invention, the apparent densities of the bodies produced, when the compacting or forming was carried out by a molding operation, were typically controlled by charging predetermined weighed portions of the mixture to the mold, and pressing the mixtures to a height controlled by an electrical limit switch. However, the mixture may be compacted or formed or pressed by other than molding methods. Such compacting may be carried out by vibrating or jiggering the mixture, extrusion, pressing, forming from a slurry of the mixture, etc.

If the mixing and forming are carried out in accordance with the foregoing described or suggested procedures, the bodies produced by baking and/or graphitizing the formed green mixtures will have satisfactory density and strength properties as well as other characteristics making them suitable for many end uses and pre-eminently suitable for use as insulating bodies.

In the baking operation the thusly prepared and formed "green" bodies are placed in a furnace and heated to baking temperatures, i.e., to temperatures between about 800° C. (1472° F.) and about 2000° C. (3632° F.). The furnace employed may be of a Sagger type and the bodies heated in same in an inert atmosphere without employing any packing materials, or the bodies may be placed in a conventional carbon body baking furnace and then surrounded by packing materials and baked in accordance with methods well known in the art. In either case the bodies are generally baked by slowly heating them to a temperature such as around 950° C. (1742° F.) following a schedule of about 10° C. or about 18° F. per hour increase over a period of about 3–4 days. If a resinous type binder is employed, the formed body is first cured, such as by heating it for 18 hours at 100° C. (212° F.) and then for 2½ hours at 200° C. (392° F.), before the body is baked.

The final temperature to which the article is heated will be governed by its eventual use. Sometimes heating the article to graphitizing temperatures, such as between about 2000° C. and about 3000° C. (between 3632° F. and 5432° F.) will be necessary or desirable. In such a case, the specimens may typically be heated to around 2500° C. (4532° F.) in a graphite tube resistance furnace, using a nitrogen atmosphere and the heating rates over the range 950° C. (1742° F.) to 2500° C. (4532° F.) varied from 100° to 400° C./hour, or from about 180° F. to about 750° F./hour.

The rate of firing the bodies or articles may also vary, depending somewhat on the properties of the materials from which the articles are made and on their size, etc. In some instances it may also be desirable to alter the rate of heating, starting at some predetermined temperature, or to maintain the carbon articles for various lengths of time at some intermediate or final temperature.

It should also be understood that although baking has generally been described as heating the bodies to temperatures between about 800° C. (1472° F.) and 2000° C. (3632° F.), and graphitizing has been described as heating the bodies to between about 2000° C. (3632° F.) and 3000° C. (5432° F.), we believe we are the first to discover that desirable low density carbon bodies can be made by mixing a suitable binder with low density expanded carbonaceous particles, compacting or forming same, and conducting said formed masses through subsequent heat treatment at temperatures approaching either the baking or graphitizing ranges. Therefore, heating such formed masses to any elevated temperatures such as to 800° C. (1472° F.) and higher is believed to be new with the present invention and of a patentable nature, and also within the meaning of the terms "baking" and "graphitizing," or "baked" and "graphitized" as employed in the claims.

The following examples and tables are set forth in order to further illustrate the mixing, forming, baking, or curing and baking, and graphitizing operations and several of the variables connected with these operations, as well as several of the properties of the bodies produced in the present invention.

EXAMPLE 11

One hundred parts of low density, expanded carbonaceous particles, having characteristics similar to those produced in Example 1, were mixed at room temperature with 27.5 parts of Fura-Tone resin in a Smith turbine type mixer for a period of about 15 minutes, and until the mixture was quite uniform in nature. Different portions of this mixture were then formed into cylinders 2¼" in diameter and about an inch long, employing forming or molding pressures of 500, 750, 1000, and 1250 p.s.i. molding pressures. The green apparent densities of these formed mixtures varied between 0.56 and 0.72, with higher density bodies being obtained as the molding pressures increased. The specimens were than cured in an oven for 18 hours at 100° C. (212° F.) and then for 2½ hours at 200° C. (392° F.). The bodies were then placed in 35/65 mesh graphite packing media in covered stainless steel saggers, and heated in a nitrogen atmosphere to baking temperatures of about 950° C. (1742° F.) on a three-day schedule, or employing a temperature upheat rate of approximately 10° C. or 18° F. per hour for three days. The apparent densities of these bodies when cured varied between 0.54 and 0.68, and when baked varied between 0.56 and 0.80. All of the specimens appeared sound.

EXAMPLE 12

Example 11 was repeated employing 32.5 parts of Fura-Tone rather than the 27.5 parts employed in Example 11. The mixing, forming, curing and baking conditions were the same. The apparent densities of the green bodies as formed varied between 0.55 and 0.85. The apparent densities of the cured bodies varied between 0.60 and 0.79, and the apparent densities of the baked bodies varied between 0.61 and 0.80. All specimens appeared sound.

EXAMPLE 13

Example 11 was repeated employing 27.5 parts of furfuryl alcohol in the place of Fura-Tone. The rest of the processing conditions were the same. The apparent densities of the green bodies produced varied between 0.61 and 0.78. The apparent densities of the cured bodies produced varied between 0.49 and 0.62, and of the baked bodies between 0.51 and 0.65. All specimens appeared sound.

EXAMPLE 14

One hundred parts of carbonaceous particles which were not cycled through a 2nd reactor, and which were similar to those produced in Example 2, were mixed with 55 parts of Fura-Tone for about 10 minutes in a Smith turbine type mixer. For the first nine minutes the mixing was carried out at a relatively slow speed, while for the last minute the mixer was run at its fastest speed. Different portions of this mixture were then formed, cured, and baked under the same conditions as set forth in Example 11. The apparent densities of the green bodies produced varied between 0.58 and 0.70. The apparent densities of the cured bodies varied between 0.50 and 0.67 and the apparent densities of the baked bodies varied between 0.60 and 0.79. All bodies appeared sound.

EXAMPLE 15

Two cylindrical bodies were formed that were 6¾ inches in diameter and about 3 inches long employing 100 parts of carbonaceous particles such as produced in Example 1 for both bodies, and 32.5 parts of Fura-Tone for one body, and 32.5 of furfuryl alcohol for the other body. The mixtures for both were made in a Smith turbine type mixer. The mixture employing Fura-Tone was molded at a pressure of 1000 p.s.i. and the mixture employing furfuryl alcohol was molded at a pressure of 1250 p.s.i. The bodies were cured and baked under processing conditions similar to those set forth in the preceding examples and were then heated to a temperature of about 2500° C. (4532° F.) or a temperature in the graphitizing range. The body made from the mixture having Fura-Tone had a green apparent density of 0.80, a baked apparent density of 0.78, and a graphitized apparent density of 0.76. The body made from the mixture using furfuryl alcohol had a green apparent density of 0.84, a baked apparent density of 0.77, and a graphitized apparent density of 0.74. Both bodies appeared sound.

EXAMPLE 16

Several baked specimens were prepared from mixtures of low density expanded carbonaceous particles and pitch binder, using mixing temperatures of about 160° C. (320° F.) in a Sigma mixer and pitch binder levels of 16.7, 20.0, and 23.1 parts per 100 parts of carbonaceous aggregate. These bodies were pressed in a 2¼ inch diameter mold at temperatures between about 150 and 155° C. (302 and 311° F.) and at molding pressures of 200, 500, 1000, and 1500 p.s.i. The pieces were strong enough to be handled through the subsequent baking operation, and after baking all specimens appeared sound. Green densities falling between 0.45 and 0.69 were obtained for the above bodies at the molding pressures of 200 and 1500 p.s.i.

The foregoing procedure was modified by diluting the pitch with both benzene and shingle stain oil, in order to spread the pitch binder over the fragile aggregate particles with a minimum of degradation. These alternative procedures were successful, and reasonable green strengths were obtained even by using reduced binder levels and mixing at room temperature. With benzene, the diluent was evaporated off before molding. The baked specimens produced from these mixtures were sound.

EXAMPLE 17

Several series of 2¼ inch diameter specimens bonded with a water emulsion of coal tar, and with dehydrated coal tar were made by heating both the aggregate and the binder to a temperature of about 100° C. (212° F.), mixing for about 15 minutes in a Sigma mixer, and then molding the mixture at room temperature and at various pressures under 1500 p.s.i. When the bodies were baked to around 900° C. (1652° F.) following a three-day baking schedule, all specimens were sound and their baked apparent densities ranged from about 0.33 to about 0.69. Their green apparent densities ranged from about 0.39 to 0.83.

EXAMPLE 18

Cylindrical specimens 3.2 inches in diameter and 7 inches long were made from carbonaceous particles which had been processed through a 2nd reactor, such as those produced in Example 1; however, in one case the particles were milled between the cyclone separator and the second reactor, while in the other case the particles were fed directly from the cyclose separator to the second reactor without milling. Coal tar at a level of about 30% was used as a binder. The formed specimens were then baked to about 950° C. (1742° F.) on a 72 hour schedule. Compressive strength tests were then carried out on the baked bodies. Specimens made from the carbonaceous aggregate which was unmilled between the cyclone separator and the 2nd reactor possessed compressive strengths of 217 and 375 p.s.i., compared to strengths of 133 and 266 p.s.i. for baked bodies which were made from carbonaceous aggregates which had been milled between the cyclone separator and the second reactor. The above strengths were obtained at densities of 0.48 and 0.56 respectively.

The following tables are set forth in order to more fully show the properties of the baked and graphitized bodies produced according to the teachings of this invention. Properties of bodies having densities slightly higher or lower than those set forth in the tables were also obtained by additional tests or by interpolation from graphs. The bodies were made from carbonaceous particles having properties similar to those produced in Example 4. The properties set forth in these tables are described or defined as follows:

(1) Apparent density—grams weight per cubic centimeter of volume. All specimens were weighed, and volumes were determined by measurement of mean length and diameter.

(2) Real density—composite samples of carbon and graphite were prepared from broken pieces of the specimens. Real density was determined by the ASTM-D167 Hograth bottle method, using water.

(3) Porosity—calculated by subtracting real volume from apparent volume, and expressing as percent of apparent volume.

(4) Ash—ash was determined by ASTM-D271, using a one-gram sample of the carbon composite, and a ten-gram sample of the graphite composite. Ashing temperature was 1385° F.

(5) Compressive strength—three whole specimens, having a length to diameter ratio of 2 to 1, from each density group of approximately 0.5, 0.6, 0.7 and 0.8, were loaded to failure at an 0.050″/minute rate of head movement. The ends of the specimens were lapped flat before testing.

(6) Modulus of elasticity—one whole specimen from each of the density groups was compressed between steel plates over the range of 10% to 50% of the breaking load. A dial indicator was used to measure the change in distance between the steel plates.

(7) Thermal conductivity—one 3″ diameter by 1″ to 1½″ long specimen from each density group was compared with standard specimens of known conductivity. Specimens and standards were machine-lapped for good thermal contact. The specimen was sandwiched between standards, and a thermal gradient was established in the train by means of an electrically heated metal block and a water cooled metal block. Temperatures were determined by means of 1/16″ diameter Megopak (Minneapolis Honeywell) thermocouples extending to the axis of the thermal train. The insulated train was enclosed in a steel box which was evacuated twice and back-filled with nitrogen. Thermal equilibrium was established at a mean specimen temperature of 375° F. (190° C.). At least one carbon specimen and one graphite specimen were tested at other mean temperatures to characterize the temperature coefficient of conductivity.

(8) Electrical resistivity—electrical resistivity was determined on at least three whole specimens from each density group, using direct current. Current was measured by means of a sensitive ammeter in the range 9 to 12 amperes, and potential drop across probes with 4″ spacing was measured with a potentiometer.

(9) Permeability—two machined cylindrical specimens 1″ diameter x 1″ long from each density group were tested. The specimen was inserted in a section of 1″ I.D. rubber radiator hose, and clamped tight with worm gear type hose clamps. The other end of the hose section was clamped to a ¾″ I.P.S. pipe section soldered to an insulated 10 gallon steel drum. Permeability to air at a mean pressure differential of 2″ of water was determined by measuring the rate of pressure decay from 3″ to 1″ water, using an open U-tube with colored water.

Table I
PROCESSING DATA

| Specimen | Parts Coal Tar Per 100 Parts of Carbon | Green A.D., g./cc. | Baking (950° C. or 1742° F.) Data | | | | Graphitizing (2500° C. or 4532° F.) Data | | | |
|---|---|---|---|---|---|---|---|---|---|---|
| | | | Percent Shrinkage | | | Percent Wgt. Loss | Percent Shrinkage | | | Percent Wgt. Loss |
| | | | Dia. | Length | Vol. | | Dia. | Length | Vol. | |
| a | 30 | .503 | 2.65 | 5.74 | 10.6 | 15.6 | | | | |
| b | 30 | .600 | 3.02 | 5.65 | 11.3 | 15.0 | | | | |
| c | 30 | .698 | 2.72 | 5.73 | 10.8 | 16.4 | | | | |
| d | 30 | .789 | 3.02 | 5.45 | 11.1 | 16.3 | | | | |
| e | 25 | .498 | 2.29 | 5.86 | 9.99 | 12.9 | 5.78 | 9.28 | 19.3 | 19.9 |
| f | 25 | .595 | 2.43 | 4.60 | 9.23 | 15.1 | 5.91 | 8.51 | 19.2 | 21.9 |
| g | 25 | .694 | 2.54 | 5.58 | 10.2 | 16.0 | 5.92 | 8.99 | 19.4 | 22.2 |
| h | 25 | .795 | 2.89 | 5.34 | 10.7 | 15.4 | 6.51 | 8.71 | 20.1 | 21.3 |
| i | 20 | .496 | 2.40 | 5.34 | 9.83 | 11.2 | | | | |
| j | 20 | .590 | 1.99 | 5.29 | 8.95 | 11.8 | | | | |
| k | 20 | .682 | 2.41 | 5.34 | 9.92 | 11.6 | | | | |
| l | 20 | .770 | 2.65 | 5.00 | 9.88 | 11.8 | | | | |

Mixing Conditions: Coal Tar Binder; both heated to 100° C. or 212° F., and mixed 15 min., Sigma mixer.
Molding Conditions: 3.2" diameter x 6" length, room temp.

Table II
PROPERTIES OF LOW DENSITY CARBON AND GRAPHITE

| | Carbon (Baked to 950° C. or 1742° F.) | | | | Graphite (Graphitized to 2500° C. or 4532° F.) | | | |
|---|---|---|---|---|---|---|---|---|
| Specimen | a | b | c | d | a | b | c | d |
| Physical Properties:[1] | | | | | | | | |
| Apparent Density, g./cc. | 0.472 | 0.575 | 0.653 | 0.743 | 0.486 | 0.591 | 0.670 | 0.762 |
| Real Density, g./cc. | 1.814 | 1.814 | 1.814 | 1.814 | 2.080 | 2.080 | 2.080 | 2.080 |
| Porosity, percent by Volume | 74.0 | 68.3 | 64.0 | 59.1 | 76.2 | 71.6 | 67.8 | 63.4 |
| Ash, percent by Wgt. | 3.9 | 3.9 | 3.9 | 3.9 | 0.08 | 0.08 | 0.08 | 0.08 |
| Compressive Strength, $10^2$ p.s.i. | 2.5 | 5.4 | 9.6 | 13.5 | 1.1 | 2.3 | 4.2 | 6.7 |
| Modulus of Elasticity, $10^4$ p.s.i. | 3.6 | 4.7 | 10.1 | 23.6 | 1.9 | 2.6 | 3.9 | 6.0 |
| Thermal Conductivity, B.t.u., in hr.-ft.$^2$-deg. F. | 2.6 | 3.3 | 4.1 | 5.1 | 29 | 43 | 56 | 73 |
| Electrical Resistivity, $10^2$ ohm-in. | 2.97 | 1.93 | 1.51 | 1.17 | 1.51 | 1.01 | 0.66 | 0.52 |
| Permeability to Air, darcys | 1.39 | 0.76 | 0.35 | 0.16 | 1.15 | 0.46 | 0.35 | 0.10 |

[1] All properties determined at ambient temperature, except thermal conductivity, which was determined at a mean temperature of 375° F.

The foregoing table sets forth typical properties of the bodies of this invention for apparent density ranges between approximately 0.5 and 0.8 g./cc. We have found also that the general ranges of two particular properties, viz., thermal conductivity and permeability of the bodies of this invention are as follows:

Table III

| | Carbon (Baked to 950° C. or 1742° F.) | | Graphite (Graphitized to 2500° C. or 4532° F.) | |
|---|---|---|---|---|
| Apparent Density, g./cc. | 0.5-0.8 | 0.4-0.9 | 0.5-0.8 | 0.4-0.9 |
| Thermal Conductivity,[1] B.t.u. in hr.-ft.$^2$-deg. F. | 2.5-6.5 | 2-9 | 25-85 | 20-115 |
| Permeability, darcys | 0.10-1.5 | 0.05-3.0 | 0.10-1.5 | 0.05-3.0 |

[1] At mean temperature of 375° F.

The above properties of the foregoing type bodies were compared with those of other baked and graphitized carbon bodies. It was found that their apparent density, thermal conductivity, and permeability to gases or liquids were all considerably different and generally much lower than for the other type bodies. Other properties of the bodies of this invention are also unique.

It is to be understood that the invention is not limited to the specific examples which have been offered merely as illustrative and that modifications may be made within the scope of the appended claims without departing from the spirit of the invention. For example, conditioning, such as activation, impregnation, etc., of the carbonaceous aggregate or of the finished bodies, is contemplated and is not precluded from the scope of the present invention. Using minor percentages of activated carbon or other types of particles to make the bodies, along with a major percentage of the expanded, low density carbonaceous particles, is also contemplated.

We claim:

1. A baked body suitable for use as a heat insulating material which is formed from a mixture comprised substantially of expanded carbonaceous particles and a binder, which have been compressed into a formed mass and baked, said expanded carbonaceous particles having a bulk density less than about 25 lbs./cu. ft., a volatile matter content no higher than about 15%, and a particle size within the range of about 5 to about 1000 microns, and said baked body having an apparent density between about 0.4 and about 0.9 gram/cubic centimeter.

2. A baked body suitable for use as a heat insulating material which is formed from a mixture comprised substantially of expanded and substantially devolatilized carbonaceous particles and a binder, which have been compressed into a formed mass and baked, said expanded and substantially devolatilized carbonaceous particles having a bulk density in the range of about 6 to about 20 lbs./cu. ft., and a particle size within the range of about 5 to about 140 microns, and said baked body having an apparent density between about 0.4 and about 0.9 gram/cubic centimeter.

3. A baked body suitable for use as a heat insulating material which is formed from a mixture comprised substantially of 100 parts of expanded carbonaceous particles and from about 10 to 60 parts of a binder, selected from the group consisting of coal tar, coal tar pitch, pitch mixed with a diluent, emulsified coal tar, dehydrated coal tar, copolymer of furfural and acetone, and furfuryl alcohol, which have been compressed into a formed mass and baked, said expanded carbonaceous particles having a bulk density less than about 25 lbs./cu. ft., a volatile matter content no higher than about 15%, and a particle size within the range of about 5 to about 1000 microns, and said baked body having an apparent density between about 0.4 and about 0.9 gram/cubic centimeter.

4. A baked body suitable for use as a heat insulating material which is formed from a mixture comprised substantially of 100 parts of expanded carbonaceous particles and from about 10 to about 60 parts of a binder, selected from the group consisting of coal tar, coal tar pitch, pitch mixed with a diluent, emulsified coal tar, dehydrated coal tar, copolymer of furfural and acetone, and furfuryl alcohol, which have been compressed into a formed mass and baked, said expanded carbonaceous particles having a bulk density less than about 25 lbs./cu. ft., a volatile matter content no higher than about 15%, and a particle size within the range of about 5 to about 1000 microns, and said baked body having an apparent density between about 0.50 and about 0.80 gram/cubic centimeter.

5. A baked body suitable for use as a heat insulating material which is formed from a mixture comprised substantially of 100 parts of expanded and substantially devolatilized carbonaceous particles and from about 10 to about 60 parts of a binder selected from the group consisting of coal tar, coal tar pitch, pitch mixed with a diluent, emulsified coal tar, dehydrated coal tar, copolymer of furfural and acetone and furfuryl alcohol, which have been compressed into a formed mass and baked, said expanded and substantially devolatilized carbonaceous particles having a bulk density in the range of about 6 to about 20 lbs./cu. ft., and a particle size within the range of about 5 to about 140 microns, and said baked body having an apparent density between about 0.4 and about 0.9 gram/cubic centimeter.

6. A baked body suitable for use as a heat insulating material which is formed from a mixture comprised substantially of 100 parts of expanded and substantially devolatilized carbonaceous particles and from about 10 to about 60 parts of a binder, selected from the group consisting of coal tar, coal tar pitch, pitch mixed with a diluent, emulsified coal tar, dehydrated coal tar, copolymer of furfural and acetone, and furfuryl alcohol, which have been compressed into a formed mass and baked, said expanded and substantially devolatilized carbonaceous particles having a bulk density in the range of about 6 to about 20 lbs./cu. ft., and a particle size within the range of about 5 to about 140 microns, and said baked body having an apparent density between about 0.50 and about 0.80 gram/cubic centimeter.

7. A baked and graphitized body suitable for use as a heat insulating material which is formed from a mixture comprised substantially of expanded carbonaceous particles and a binder, which have been compressed into a formed mass, baked and graphitized, said expanded carbonaceous particles having a bulk density in the range of about 6 to about 20 lbs./cu. ft., a volatile matter content no higher than about 15%, and a particle size within the range of about 5 to about 140 microns, and said graphitized body having an apparent density between about 0.4 and about 0.9 gram/cc.

8. A baked and graphitized body suitable for use as a heat insulating material which is formed from a mixture comprised substantially of expanded and substantially devolatilized carbonaceous particles and a binder, which have been compressed into a formed mass, baked and graphitized, said expanded and substantially devolatilized carbonaceous particles having a bulk density in the range of about 6 to about 20 lbs./cu. ft., and a particle size within the range of about 5 to about 140 microns, and said graphitized body having an apparent density between about 0.4 and about 0.9 gram/cubic centimeter.

9. A baked carbonaceous body having the following properties: an apparent density between 0.40 and 0.90 gram per cubic centimeter, a thermal conductivity at a mean temperature of 375° F. between about 2 and about 9 B.t.u. inches/hr. ft.$^2$ deg. F., and a permeability between about 0.05 and about 3.0 darcys.

10. A baked carbonaceous body having the following properties: an apparent density between about 0.50 and about 0.80 gram per cubic centimeter, a thermal conductivity at a mean temperature of 375° F. between about 2.5 and about 6.5 B.t.u. inches/hr. ft.$^2$ deg. F., and a permeability between about 0.10 and about 1.5 darcys.

11. A graphitized carbonaceous body having the following properties: an apparent density between 0.40 and 0.90 gram per cubic centimeter, a thermal conductivity at a mean temperature of 375° F. between about 20 and about 115 B.t.u. inches/hr. ft.$^2$ deg. F., and a permeability between about 0.05 and about 3.0 darcys.

12. A graphitized carbonaceous body having the following properties: an apparent density between about 0.50 and about 0.80 gram per cubic centimeter, a thermal conductivity at a mean temperature of 375° F. between about 25 and about 85 B.t.u. inches/hr. ft.$^2$ deg. F., and a permeability between about 0.10 and about 1.5 darcys.

References Cited in the file of this patent

UNITED STATES PATENTS

| | | |
|---|---|---|
| 2,077,094 | Byers | Apr. 13, 1937 |
| 2,392,682 | Marek | Jan. 8, 1946 |
| 2,625,512 | Powell | Jan. 13, 1953 |
| 2,706,706 | Pettyjohn | Apr. 19, 1955 |
| 2,868,695 | Shea | Jan. 13, 1959 |
| 2,955,988 | Sebastian | Oct. 11, 1960 |
| 3,001,237 | Balaguer | Sept. 26, 1961 |
| 3,079,266 | Galy | Feb. 26, 1963 |